(12) United States Patent
Tuda

(10) Patent No.: US 7,922,095 B2
(45) Date of Patent: Apr. 12, 2011

(54) INFORMATION STORAGE MEDIUM AND MEDIUM PROCESSING SYSTEM

(75) Inventor: Yusuke Tuda, Fuchu (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 12/537,674

(22) Filed: Aug. 7, 2009

(65) Prior Publication Data

US 2010/0012723 A1 Jan. 21, 2010

Related U.S. Application Data

(63) Continuation of application No. PCT/JP2008/051869, filed on Feb. 5, 2008.

(30) Foreign Application Priority Data

Feb. 7, 2007 (JP) ................................. 2007-028416

(51) Int. Cl.
  *G06K 19/06* (2006.01)
(52) U.S. Cl. ....................................... 235/492; 235/487
(58) Field of Classification Search .................. 235/487, 235/492, 380
  See application file for complete search history.

(56) References Cited

U.S. PATENT DOCUMENTS

| | | | | |
|---|---|---|---|---|
| 5,365,045 A * | 11/1994 | Iijima | ............................ | 235/380 |
| 7,343,452 B2 * | 3/2008 | Nishimura | .................... | 711/115 |
| 2007/0124530 A1* | 5/2007 | Ishibashi | ........................... | 711/1 |

FOREIGN PATENT DOCUMENTS

| | | |
|---|---|---|
| JP | 3-280136 A | 12/1991 |
| JP | 5-151061 A | 6/1993 |
| JP | 2001-256442 A | 9/2001 |
| JP | 2002-169783 | 6/2002 |
| JP | 2004-178101 A | 6/2004 |
| JP | 2004-206277 A | 7/2004 |
| JP | 2005-267516 | 9/2005 |
| JP | 2005-292991 A | 10/2005 |
| JP | 2006-350807 | 12/2006 |

OTHER PUBLICATIONS

International Search Report dated May 13, 2008 for International Application No. PCT/JP2008/051869.

* cited by examiner

*Primary Examiner* — Thien M. Le
*Assistant Examiner* — Christle I Marshall
(74) *Attorney, Agent, or Firm* — Pillsbury Winthrop Shaw Pittman, LLP

(57) ABSTRACT

An information storage medium includes storage unit for storing first, second, and third data composed of a data structure including identification information which identifies process target data, length information indicating data length of the process target data, and the process target data, communication unit for communicating with a medium processing device, and data processing unit for accessing the process target data included in the second data on the basis of a first command received via the communication unit, the first command specifying the identification information included in the second data and ordering processing of the process target data included in the second data, and subsequently accessing the process target data included in the first data on the basis of a second command including a preceding data specification and ordering processing of the process target data.

13 Claims, 5 Drawing Sheets

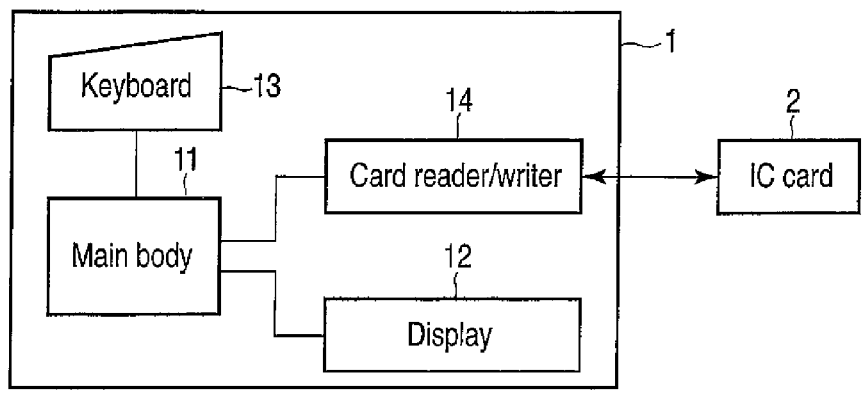
F I G. 1
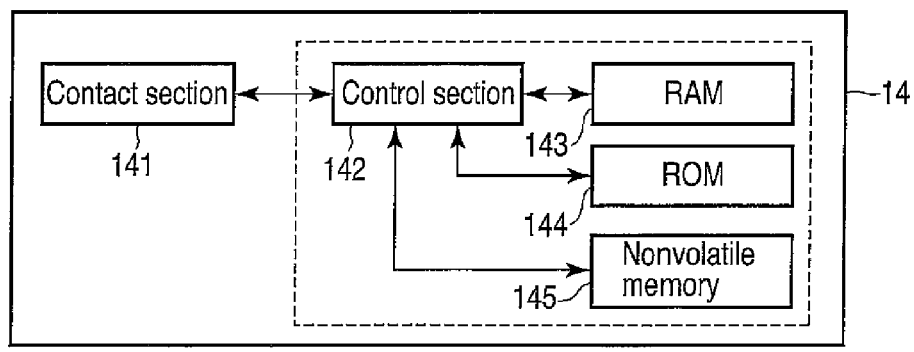
F I G. 2
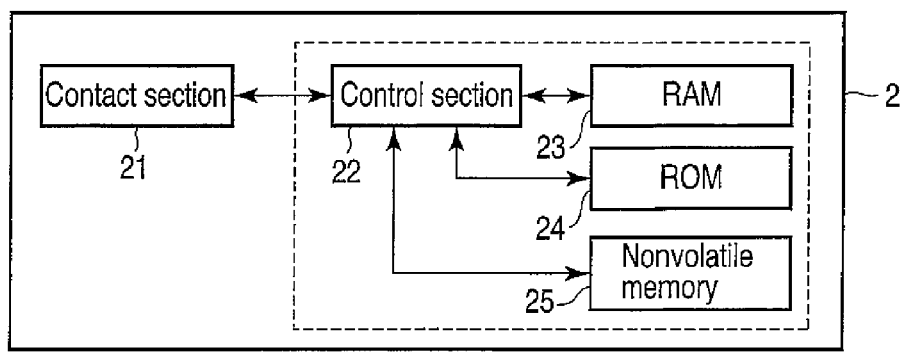
F I G. 3

| First data (251): | T1 | L1 | V1 |
|---|---|---|---|
| Second data (252): | T2 | L2 | V2 |
| Third data (253): | T3 | L3 | V3 |

FIG. 4

| First data (251): | T1 | L1 | V1 | | |
|---|---|---|---|---|---|
| Second data (252): | T2 | L2 | V2 | | |
| | | | Third data (253): | T3 L3 V3 | |
| | | | Fourth data (254): | T4 L4 V4 | |
| Fifth data (255): | T5 | L5 | V5 | | |

FIG. 5A

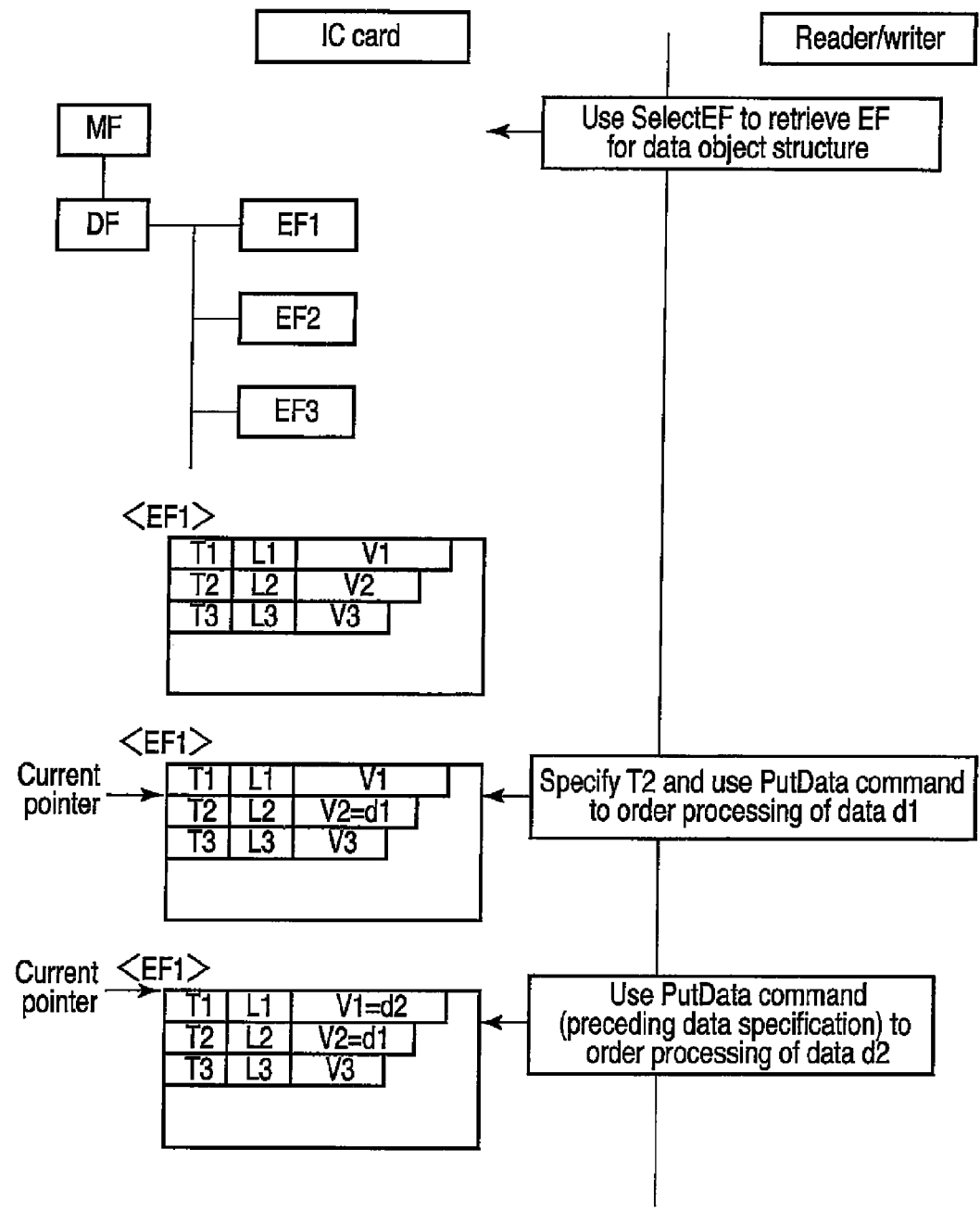
F I G. 6

INFORMATION STORAGE MEDIUM AND MEDIUM PROCESSING SYSTEM

CROSS-REFERENCE TO RELATED APPLICATIONS

This is a Continuation Application of PCT Application No. PCT/JP2008/051869, filed Feb. 5, 2008, which was published under PCT Article 21(2) in Japanese.

This application is based upon and claims the benefit of priority from prior Japanese Patent Application No. 2007-028416, filed Feb. 7, 2007, the entire contents of which are incorporated herein by reference.

BACKGROUND OF THE INVENTION

1. Field of the Invention

The present invention relates to, for example, an information storage medium called an IC card and having a built-in IC (Integrated Circuit) chip with a nonvolatile data memory and a control element such as CPU. Moreover, the present invention relates to a medium processing system composed of such an information storage medium and a medium processing device called a reader/writer and which records data in the information storage medium and which reads data stored in the information storage medium.

2. Description of the Related Art

In recent years, secure IC cards (contact type and non-contact type) have been prevailing remarkably. These IC cards have a nonvolatile memory that can hold data even when power supply is cut off, a communication I/F that can communicate with a reader/writer, a control element such as CPU which performs various operations, ROM that stores operation programs for CPU, and RAM that temporarily stores data.

ISO/IEC7816-4 specifies the concept of EF (Elementary File) as a data structure for accesses via commands. A record type structure, a linear structure, and a cyclic structure have been defined for EF.

ISO/IEC7816-4(2005) has a new additional concept of EF for a data object structure. That is, ISO/IEC7816-4(2005) has the additional basic concept of a data object structure composed of several data of a TVL data structure composed of a tag section, a length section, and a value section. The tag section describes a tag (identification information) indicating the type of data. The length section stores the data length of the data stored in the value section. The value section stores the process target data (write or read data). A data object is normally retrieved by specifying the value of the tag.

For example, a technique for the retrieval of a data object is disclosed in Jpn. Pat. Appln. KOKAI Publication No. 2004-178101. A summary of the technique disclosed in Jpn. Pat. Appln. KOKAI Publication No. 2004-178101 is provided below. An IC card reader reads a file recorded in a recording section of an IC card through communication with a main control section. The IC card reader registers a repetitive read execution command in association with registration numbers. To read information in which the position of data to be read is unspecified, from the IC card, the IC card reader receives, from the main control section, an interpreter execution command including a registration number and specification information to be searched for. The IC card reader uses the registered read execution command to search for a data object in an IC card file having the specification information. The IC card reader then returns the data object to the main control section as an interpreter execution response.

BRIEF SUMMARY OF THE INVENTION

ISO/IEC7816 defines EF concepts as a method for managing data in the memory in the IC card. Among the EFs, particularly for the data object type EF, to retrieve a data object, the value of the tag for the data object is specified to retrieve the data object.

However, the method of specifying the value of the tag to retrieve the data object is not so efficient because the value of the tag is specified every time the data object to be accessed is retrieved.

An object of the present invention is to solve this problem to provide an information storage medium and a medium processing system which enable efficient data retrieval.

The information storage medium and medium processing system according to the present invention are configured as described below.

(1) The information storage medium (IC card) according to the present invention comprises a card main body in which a module is embedded, the module comprising storage means for storing first data comprising a data structure (TLV structure data) including identification information (tag) which identifies process target data, length information (length) indicating data length of the process target data, and the process target data (value), second data succeeding the first data and comprising the same data structure as that of the data structure of the first data, and third data succeeding the second data and comprising the same data structure as that of the data structure of the first data, communication means for communicating with a medium processing device (reader/writer), and data processing means for accessing the process target data included in the second data on the basis of a first command received via the communication means, the first command specifying the identification information included in the second data and ordering processing of the process target data included in the second data, and subsequently the process target data included in the first data on the basis of a second command received via the communication means, the second command including a preceding data specification and ordering processing of the process target data.

(2) The information storage medium according to the present invention comprises a card main body in which a module is embedded, the module comprising storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data, communication means for communicating with a medium processing device, and data processing means for accessing the process target data included in the third data on the basis of a first command received via the communication means, the first command specifying the identification information included in the third data and ordering processing of the process target data included in the third data, and subsequently the process target data included in the fifth data on the basis of a second command received via the communication means, the second command including a succeeding data specification and ordering processing of the process target data.

(3) The information storage medium according to the present invention comprises a card main body in which a module is embedded, the module comprising storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data, communication means for communicating with a medium processing device, and data processing means for accessing the process target data included in the first data on the basis of a first command received via the communication means, the first command specifying the identification information included in the first data and ordering processing of the process target data included in the first data, subsequently accessing the process target data included in the third data on the basis of a second command received via the communication means, the second command including a succeeding data specification and ordering processing of the process target data, and subsequently the process target data included in the fourth data on the basis of a third command received from the communication means, the fourth command including a succeeding data specification and ordering processing of the process target data, the data processing means, after the process of the third command, inhibiting an access to the process target data included in the fifth data based on a fourth command received via the communication means, the fourth command including a succeeding data specification and ordering processing of the process target data, and after the process of the first command, inhibiting an access to the process target data included in the first data based on a fifth command received via the communication means, the fifth command including a preceding data specification and ordering processing of the process target data.

(4) The medium processing system according to the present invention comprises an information storage medium comprising a card main body in which a module is embedded and a medium processing device which records data in the information storage medium and which reads data stored in the information storage medium, the module of the information storage medium comprising storage means for storing first data comprising a data structure including identification information which identifies process target data, length information indicating data length of the process target data, and the process target data, second data succeeding the first data and comprising the same data structure as that of the data structure of the first data, and third data succeeding the second data and comprising the same data structure as that of the data structure of the first data, first communication means for communicating with the medium processing device, and data processing means for accessing the process target data included in the second data on the basis of a first command received via the first communication means, the first command specifying the identification information included in the second data and ordering processing of the process target data included in the first data, and subsequently the process target data included in the first data on the basis of a second command received via the first communication means, the second command including a preceding data specification and ordering processing of the process target data, the medium processing device comprising command generating means for generating the first and second commands and second communication means for communication with the information storage medium to input the first and second commands to the information storage medium.

(5) The medium processing system according to the present invention comprises an information storage medium comprising a card main body in which a module is embedded and a medium processing device which records data in the information storage medium and which reads data stored in the information storage medium, the module of the information storage medium comprising storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data, first communication means for communicating with the medium processing device, and data processing means for accessing the process target data included in the third data on the basis of a first command received via the communication means, the first command specifying the identification information included in the third data and ordering processing of the process target data included in the third data, and subsequently the process target data included in the fifth data on the basis of a second command received via the communication means, the second command including a succeeding data specification and ordering processing of the process target data, the medium processing device comprising command generating means for generating the first and second commands and second communication means for communication with the information storage medium to input the first and second commands to the information storage medium.

(6) The medium processing system according to the present invention comprises an information storage medium comprising a card main body in which a module is embedded and a medium processing device which records data in the information storage medium and which reads data stored in the information storage medium, the module of the information storage medium comprising storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data, first communication means for communicating with the medium processing device, and data processing means for accessing the process target data included in the first data on the basis of a first command received via the first communication means, the first command specifying the identification information included in the first data and ordering processing of the process target data included in the first data, subsequently accessing the process target data included in the third data on the basis of a second command received via the communication means, the second command including a succeeding data specification and ordering processing of the process target data, and subsequently the process target data included in the fourth data on the basis of a third command received from the communication means, the third command including a succeeding data specification and ordering processing of the process target data, the data processing means, after the process of the third command, inhibiting an access to the process target data included in the fifth data based on a fourth command received via the first communication means, the fourth command including a succeeding data specification and ordering processing of the process target data, and after the process of the first command, inhibiting an access to the process target data included in the first data based on a fifth command received via the first communication means, the fifth command including a preceding data specification and ordering processing of the process target data, the medium processing device comprising command generating means for generating the first, second, third, fourth, and fifth commands and second communication means for communication with the information storage medium to input the first, second, third, fourth, and fifth commands to the information storage medium.

BRIEF DESCRIPTION OF THE SEVERAL VIEWS OF THE DRAWING

FIG. 1 is a block diagram schematically showing the configuration of an IC card system (medium processing system) according to an embodiment of the present invention;

FIG. 2 is a block diagram schematically showing the configuration of a card reader/writer according to an embodiment of the present invention;

FIG. 3 is a block diagram schematically showing the configuration of an IC card according to an embodiment of the present invention;

FIG. 4 is a diagram showing a first example of EF for a data object structure stored in a nonvolatile memory;

FIG. 5A is a diagram showing a second example of EF for a data object structure stored in the nonvolatile memory;

FIG. 6 is a state transition diagram showing an example of an access to the EF data shown in FIG. 4.

DETAILED DESCRIPTION OF THE INVENTION

Figure 5B:
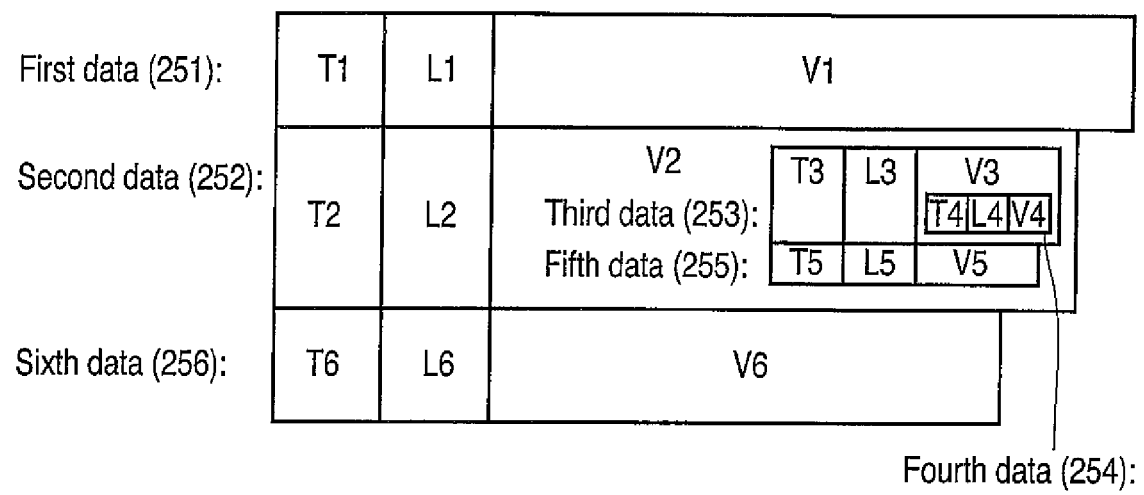
FIG. 5B is a diagram showing a third example of EF for a data object structure stored in the nonvolatile memory.

An embodiment of the present invention will be described below with reference to the drawings.

FIG. 1 is a block diagram schematically showing the configuration of an IC card system (media processing system) according to an embodiment of the present invention. As shown in FIG. 1, the IC card system is composed of a terminal 1 and an IC card 2. The terminal 1 comprises a main body 11, a display 12, a keyboard 13, and a card reader/writer 14. The terminal 1 is configured to be communicable with the IC card 2. The terminal 1 transmits and receives data to and from the IC card 2.

The main body 11 executes applications and inputs and outputs data. The display 12 displays results of communications with the IC card 2. The keyboard 13 inputs characters, numbers, and the like to the main body 11. The card reader/writer 14 communicates with the IC card 2.

FIG. 2 is a block diagram schematically showing the configuration of a card reader/writer according to an embodiment of the present invention. As shown in FIG. 2, the card reader/writer 14 comprises a contact section 141, a control section 142, RAM 143, ROM 144, and a nonvolatile memory 145.

FIG. 3 is a block diagram schematically showing the configuration of an IC card according to an embodiment of the present invention. As shown in FIG. 3, the IC card 2 comprises a contact section 21, a control section 22 having a control element such as CPU, RAM 23, ROM 24, and a nonvolatile memory 25 such as EEPROM, FRAM, or a flash memory.

The contact section 141 of the card reader/writer 14 is an interface connected to the contact section 21 of the IC card 2 to transmit data between the card reader/writer 14 and the IC card 2. The control section 142 generates various commands on the basis of instructions from the main body 11. RAM 143 temporarily stores, for example, data transmitted by the IC card 2. ROM 144 stores control programs to be executed by the control section 142. The nonvolatile memory 145 is a memory that can hold data even after power supply has been cut off.

The control section 22 of the IC card 2 controls a writing operation and a reading operation on the basis of various commands transmitted by the card reader/writer 14. RAM 23 temporarily stores, for example, the results of processes executed by the control section 22. ROM 24 stores control programs to be executed by the control section 22. The nonvolatile memory 25 is a memory that can hold data even after power supply has been cut off.

FIG. 4 is a diagram showing a first example of EF for a data object structure stored in the nonvolatile memory 25. As shown in FIG. 4, the nonvolatile memory 25 stores, for example, first data 251, second data 252, and third data 253. The first data 251 includes identification information (T1) that identifies process target data, length information (L1) indicating the data length of the process target data, and the process target data (V1). Similarly, the second data 252 includes identification information (T2) that identifies process target data, length information (L2) indicating the data length of the process target data, and the process target data (V2). Similarly, the third data 253 includes identification information (T3) that identifies process target data, length information (L3) indicating the data length of the process target data, and the process target data (V3). The second data 252 succeeds the first data 251. Furthermore, the third data 253 succeeds the second data 252. For example, the identification information may be assigned to the data such that the sequential relationship between the first data 251 and the second data 252 and the third data 253 can be determined from values (the magnitude of the values) for the identification information (T1), the identification information (T2), and the identification information (T3).

Now, with reference to FIG. 6, an access to data in EF shown in FIG. 4 will be described. As shown in FIG. 6, a folder structure having MF (Master File), DF belonging to MF, and EF1, EF2, EF3, . . . belonging to DF is constructed in the IC card 2. The card reader/writer 14 uses SelectEF to retrieve EF for a data object structure. For example, it is assumed that EF1 is a data object type structure and that the data structure of EF1 is as shown in FIG. 4.

First, a preceding data specification will be described.

First, the card reader/writer 14, for example, specifies T2 and uses a PutData command to order processing of data d1 (for example, biometric authentication data). Thus, the IC card 2 accesses V2 and records the data d1 in V2 (V2=d1). At this time, a current pointer is set at a leading address of T2.

Subsequently, the card reader/writer 14, for example, uses the PutData command (preceding data specification) to order processing of data d2 (for example, biometric authentication data) (the preceding data specification is made using a parameter of the PutData command). Thus, the IC card 2 accesses V1 to record the data 2 in V1 (V1=d2). That is, the IC card 2 accesses V1 positioned backward with reference to the current pointer set at the leading address of T2. At this time, the current pointer is moved and set at a leading address of T1.

Second, a succeeding data specification will be described.

First, the card reader/writer 14, for example, specifies T2 and uses the PutData command to order processing of the data d1 to be processed. Thus, the IC card 2 accesses V2 and records data d1 in V2 (V2=d1). At this time, the current pointer is set at the leading address of T2.

Subsequently, the card reader/writer 14, for example, uses the PutData command (succeeding data specification (a specification from a parent to a child)) to order processing of the data d2 (the succeeding data specification is made using the parameter of the PutData command). Thus, the IC card 2 accesses V3 to record the data 2 in V3 (V3=d2). That is, the IC card 2 accesses V3 positioned backward with reference to the current pointer set at the leading address of T2. At this time, the current pointer is moved to and set at a leading address of T3.

Thus, numbers are added to the recorded data d2 in order of registration or in order of increasing or decreasing Tag value. Thus, the data d2 already written using the PutData command can be accessed by specifying any of the numbers.

In this manner, the series of data can be efficiently accessed.

FIG. 5A is a diagram showing a second example of FE for a data object structure stored in the nonvolatile memory 25. As shown in FIG. 5A, the nonvolatile memory 25 stores, for example, first data 251, second data 252, third data 253, fourth data 254, and fifth data 255. The first data 251 includes identification information (T1) identifying process target data, length information (L1) indicating the data length of the process target data, and the process target data (V1). Similarly, the second data 252 includes identification information (T2) identifying process target data, length information (L2) indicating the data length of the process target data, and the process target data (V2). It should be noted that the process target data (V2) includes the third data 253 and the fourth data 254. Such second data 252 is called a constructed TLV structure. The third data 253 includes identification information (T3) identifying process target data, length information (L3) indicating the data length of the process target data, and the process target data (V3). The fourth data 254 includes identification information (T4) identifying process target data, length information (L4) indicating the data length of the process target data, and the process target data (V4). The fifth data 255 includes identification information (T5) identifying process target data, length information (L5) indicating the data length of the process target data, and the process target data (V5). The second data 252 succeeds the first data 251. Furthermore, the fifth data 253 succeeds the second data 252. The positional relationship among the first data 251, the second data 252, the third data 253, the fourth data 254, and the fifth data 255 can be determined from, for example, values (the magnitudes of the values) for the identification information (T1), the identification information (T2), the identification information (T3), the identification information (T4), and the identification information (T5). The identification information (T2) belonging to the constructed TLV structure is called a parent tag. The identification information (T3) is called a child tag. The identification information (T4) is called a child tag.

Now, an access to the data in EF shown in FIG. 5A will be described.

First, a succeeding data specification will be described.

First, the card reader/writer 14, for example, specifies T1 and uses the PutData command to order processing of the data d1 (for example, biometric authentication data). Thus, the IC card 2 accesses V1 and records the data d1 in V1 (V1=d1). At this time, the current pointer is set at the leading address of T1.

Subsequently, the card reader/writer 14, for example, uses the PutData command (succeeding data specification) to order processing of the data d2 (for example, biometric authentication data) (the succeeding data specification is made using the parameter of the PutData command). Thus, the IC card 2 accesses V2 to record the data 2 in V2 (V2=d2). That is, the IC card 2 accesses V2 positioned backward with reference to the current pointer set at the leading address of T1. At this time, the current pointer is moved and set at the leading address of T2.

Moreover, the card reader/writer 14, for example, uses the PutData command (succeeding data specification (a specification from a parent to a child)) to order processing of data d3 (for example, biometric authentication data) (the succeeding data specification is made using the parameter of the PutData command). Thus, the IC card 2 accesses V3 to record the data 3 in V3 (V3=d3). That is, the IC card 2 accesses V3 positioned backward with reference to the current pointer set at the leading address of T2. At this time, the current pointer is moved to and set at the leading address of T3.

Moreover, the card reader/writer 14, for example, uses the PutData command (succeeding data specification (a specification for data external to the constructed TLV structure)) to order processing of data d4 (for example, biometric authentication data) (the succeeding data specification is made using the parameter of the PutData command). Thus, the IC card 2 accesses VS to record the data 4 in V5 (V5=d4). That is, the IC card 2 accesses V5 positioned backward with reference to the current pointer set at the leading address of T3. At this time, the current pointer is moved to and set at a leading address of T5.

In the case described above, the succeeding data specification is used to access the data in order of V1→V2 (parent)→V3 (child)→V5. However, the succeeding data specification may be used to access the data in order of V1→V2 (parent)→V3 (child)→V4 (child)→V5.

Second, a preceding data specification will be described.

First, the card reader/writer 14, for example, specifies T4 and uses the PutData command to order processing of the data d1 (for example, biometric authentication data). Thus, the IC card 2 accesses V4 and records the data d1 in V4 (V4=d1). At this time, the current pointer is set at a leading address of T4.

Subsequently, the card reader/writer 14, for example, uses the PutData command (preceding data specification (a specification from a child to a child) to order processing of the data d2 (for example, biometric authentication data) (the preceding data specification is made using the parameter of the PutData command). Thus, the IC card 2 accesses V3 to record the data 2 in V3 (V3=d2). That is, the IC card 2 accesses V3 positioned backward with reference to the current pointer set at the leading address of T4. At this time, the current pointer is moved and set at the leading address of T3.

Moreover, the card reader/writer 14, for example, uses the PutData command (preceding data specification (constructed TLV structure)) to order processing of the data d3 (for example, biometric authentication data) (the preceding data specification is made using the parameter of the PutData command). Thus, the IC card 2 accesses V1 to record the data 3 in V1 (V1=d3). That is, the IC card 2 accesses V1 positioned backward with reference to the current pointer set at the leading address of T3. At this time, the current pointer is moved and set at the leading address of T1.

Thus, the recorded data d1, d2, and d3 are numbered in order of registration or in order of increasing or decreasing Tag value. Thus, the data d1, d2, and d3 already written using the PutData command can be accessed by specifying any of the numbers.

In the case described above, the preceding data specification is used to access the data in order of V4 (child)→V3 (child)→V1. However, the preceding data specification may be used to access the data in order of V4 (child)→V3 (child) →V2 (parent)→V1.

Third, a succeeding data specification (restricted type) will be described.

First, the card reader/writer 14, for example, specifies T3 and uses the PutData command to order processing of the data d1 (for example, biometric authentication data). Thus, the IC card 2 accesses V3 and records the data d1 in V3 (V3=d1). At this time, the current pointer is set at the leading address of T3.

Subsequently, the card reader/writer 14, for example, uses the PutData command (succeeding data specification (a specification from a child to a child)) to order processing of the data d2 (for example, biometric authentication data) (the succeeding data specification is made using the parameter of the PutData command). Thus, the IC card 2 accesses V4 to record the data 2 in V4 (V4=d2). That is, the IC card 2 accesses V4 positioned backward with reference to the current pointer set at the leading address of T3. At this time, the current pointer is moved and set at a leading address of T4.

Moreover, the card reader/writer 14, for example, uses the PutData command (a specification for data external to the constructed TLV structure) to order processing of the data d3 (for example, biometric authentication data) (the succeeding data specification is made using the parameter of the PutData command). In this case (restricted case), the IC card 2 inhibits V5 from being accessed. That is, the IC card 2 inhibits the data external to the second data 252 (constructed TLV structure) from being accessed. This makes it possible to enhance security.

Fourth, a preceding data specification (restricted type) will be described.

First, the card reader/writer 14, for example, specifies T4 and uses the PutData command to order processing of the data d1 (for example, biometric authentication data). Thus, the IC card 2 accesses V4 and records the data d1 in V4 (V4=d1). At this time, the current pointer is set at the leading address of T4.

Subsequently, the card reader/writer 14, for example, uses the PutData command (preceding data specification (a specification from a child to a child)) to order processing of the data d2 (for example, biometric authentication data) (the preceding data specification is made using the parameter of the PutData command). Thus, the IC card 2 accesses V3 to record the data 2 in V3 (V3=d2). That is, the IC card 2 accesses V3 positioned backward with reference to the current pointer set at the leading address of T4. At this time, the current pointer is moved and set at a leading address of T3.

Moreover, the card reader/writer 14, for example, uses the PutData command (preceding data specification (a specification for data external to the constructed TLV structure) to order processing of the data d3 (for example, biometric authentication data) (the preceding data specification is made using the parameter of the PutData command). In this case (restricted case), the IC card 2 inhibits V1 from being accessed. That is, the IC card 2 inhibits the data external to the second data 252 (constructed TLV structure) from being accessed. This makes it possible to enhance security.

Now, a variation of the preceding data specification will be described.

With the IC card 2 accessing V4 (child), that is, with the current pointer moved and set at the leading address of T4, the card reader/writer 14, for example, uses the PutData command (preceding data specification (a specification from a child to a parent)) to order processing of data dn (for example, biometric authentication data) (the preceding data specification is made using the parameter of the PutData command). Thus, the IC card 2 accesses V2 (parent) to record the data dn in V2 (V2=dn). That is, the IC card 2 accesses V2 (parent) positioned backward with reference to the current pointer set at the leading address of T4. At this time, the current pointer is moved and set at the leading address of T2.

Now, with reference to FIG. 5B, description will be given of a third example of EF for a data object structure stored in the nonvolatile memory 25.

As shown in FIG. 5B, the nonvolatile memory 25 stores, for example, the first data 251, the second data 252, the third data 253, the fourth data 254, the fifth data 255, sixth data 256. The first data 251 includes identification information (T1) identifying process target data, length information (L1) indicating the data length of the process target data, and the process target data (V1). Similarly, the second data 252 includes identification information (T2) identifying process target data, length information (L2) indicating the data length of the process target data, and the process target data (V2). Moreover, the process target data (V2) includes the third data 253 and the fifth data 255. Such second data 252 is called a constructed TLV structure. The third data 253 includes identification information (T3) identifying process target data, length information (L3) indicating the data length of the process target data, and the process target data (V3). The fifth data 255 includes identification information (T5) identifying process target data, length information (L5) indicating the data length of the process target data, and the process target data (V5).

Moreover, the process target data (V3) includes the fourth data 254. Such third data 253 is also called a constructed TLV structure. The fourth data 254 includes identification information (T4) identifying process target data, length information (L4) indicating the data length of the process target data, and the process target data (V4).

The positional relationship among the first data 251, the second data 252, the third data 253, the fourth data 254, the fifth data 255, and the sixth data 256 can be determined from, for example, the values (the magnitudes of the values) for the identification information (T1), the identification information (T2), the identification information (T3), the identification information (T4), and the identification information (TS).

Here, the succeeding data specifications for the data object structure shown in FIG. 5B are used to access the data in order of V1→V2→V3→V4→V6 or V1→V2→V3→V4→V5→V6. Furthermore, the preceding data specifications are used to access the data in order of V6→V4→V3→V2→V1, V6→>V4→V2→V1, V6→V4→V1, V6→V5→V4→V3→V2→V, V6→V5→V4→V2→V1, or V6→V5→V4→V1.

Figure 7:
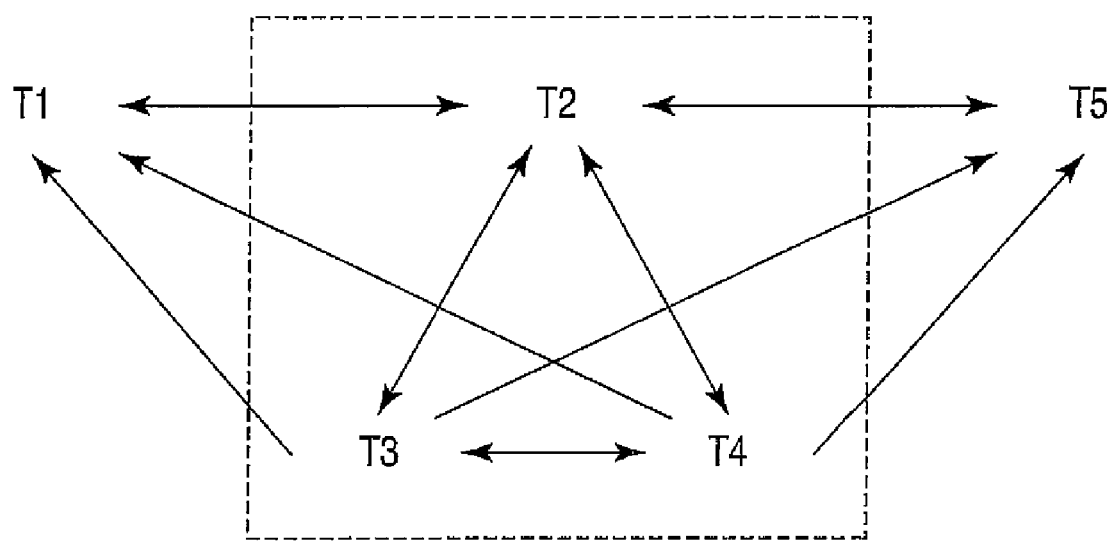
FIG. 7 is a diagram illustrating movement in a constructed TLV structure.

The several succeeding and preceding data specifications have been described. However, the present embodiments are not limited to this. For example, the constructed TLV structure can be moved as shown in FIG. 7.

As described above, the application of the current pointer enables the data object succeeding or preceding the current one to be efficiently accessed using the succeeding or preceding data specification, respectively.

Furthermore, for the constructed data object, layered data objects and data objects written in a data section can each be efficiently specified and accessed. This increases access speed and write speed. Additionally, the data object can be specified without the need to specify the tag. Thus, advantageously, users can easily understand how to manipulate the data.

In the description of the case in FIG. 6, SelectEF is used to retrieve EF before the tag is specified. However, the present embodiment is not limited to this. For example, the tag may be specified with DF selected.

The present invention is not limited to the above-described embodiments. In implementation, many variations may be made to the embodiments without departing from the spirit of the present invention. Any of the embodiments may be combined together if possible. In this case, combined effects are exerted. Moreover, each of the embodiments includes inventions of various levels. Various inventions can thus be extracted by appropriately combining a plurality of the disclosed components together. For example, if the problems described in the section "Problems to Be Solved by the Invention" can be solved and the effects described in the section "Effects of the Invention" even when some of the components shown in the embodiments are removed, the configuration with these components removed can be extracted as an invention.

INDUSTRIAL APPLICABILITY

The present invention can provide an information storage medium and medium processing system which enable efficient data retrieval.

What is claimed is:

1. An information storage medium comprising a card main body in which a module is embedded, the information storage medium being characterized in that the module comprises:
storage means for storing first data comprising a data structure including identification information which identifies process target data, length information indicating data length of the process target data, and the process target data, second data succeeding the first data and comprising the same data structure as that of the data structure of the first data, and third data succeeding the second data and comprising the same data structure as that of the data structure of the first data;
communication means for communicating with a medium processing device; and
data processing means for accessing the process target data included in the second data on the basis of a first command received via the communication means, the first command specifying the identification information included in the second data and ordering processing of first process data, and subsequently accessing the process target data included in the first data on the basis of a second command received via the communication means, the second command including a preceding specification and ordering processing of second process data.

2. The information storage medium according to claim 1, wherein the data processing means sets a current pointer for the identification information included in the second data on the basis of the first command and accesses the process target data included in the first data positioned forward with reference to the current pointer on the basis of the preceding specification in the second command.

3. The information storage medium according to claim 1, wherein the data processing means accesses the process target data included in the second data on the basis of the first command received via the communication means, the first command specifying the identification information included in the second data and ordering processing of the first process data, and accesses the process target data included in the third data on the basis of a third command received via the communication means, the third command including a succeeding specification and ordering processing of third process data.

4. The information storage medium according to claim 3, wherein the data processing means sets the current pointer for the identification information included in the second data on the basis of the first command and accesses the process target data included in the third data positioned backward with reference to the current pointer on the basis of the succeeding specification in the third command.

5. The information storage medium according to claim 1, wherein the data processing means determines a sequential relationship between the first data and the second data and the third data on the basis of values indicated by the identification information included in the first, second, and third data.

6. An information storage medium comprising a card main body in which a module is embedded, the information storage medium being characterized in that module comprises:
storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data;
communication means for communicating with a medium processing device; and
data processing means for accessing the process target data included in the third data on the basis of a first command received via the communication means, the first command specifying the identification information included in the third data and ordering processing of first process data, and subsequently accessing the process target data included in the fifth data on the basis of a second command received via the communication means, the second command including a succeeding specification and ordering processing of second process data.

7. The information storage medium according to claim 6, wherein after the process of the first command, the data processing means accesses the process target data included in the fourth data on the basis of a third command received via the communication means, the third command including a succeeding specification and ordering processing of third process data, and accesses the process target data included in the fifth data on the basis of a fourth command received via the communication means, the fourth command including a succeeding specification and ordering processing of fourth process data.

8. The information storage medium according to claim 7, wherein after the process of the third command, the data processing means accesses the process target data included in the second data on the basis of a fifth command received via the communication means, the fifth command including a preceding specification and ordering processing of fifth process data.

9. The information storage medium according to claim 7, wherein after the process of the third command, the data processing means accesses the process target data included in the first data on the basis of a fifth command received via the communication means, the fifth command including a preceding specification and ordering processing of fifth process data.

10. An information storage medium comprising a card main body in which a module is embedded, the information storage medium being characterized in that the module comprises:
   storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data;
   communication means for communicating with a medium processing device; and
   data processing means for accessing the process target data included in the third data on the basis of a first command received via the communication means, the first command specifying the identification information included in the third data and ordering processing of first process data, and subsequently accessing the process target data included in the fourth data on the basis of a second command received via the communication means, the second command including a succeeding specification and ordering processing of second process data,
   the data processing means, after the process of the second command, inhibiting an access to the process target data included in the fifth data based on a third command received via the communication means, the third command including a succeeding specification and ordering processing of third process data, and after the process of the first command, inhibiting an access to the process target data included in the first data based on a fourth command received via the communication means, the fourth command including a preceding specification and ordering processing fourth process data.

11. A medium processing system comprising an information storage medium comprising a card main body in which a module is embedded and a medium processing device which records data in the information storage medium and which reads data stored in the information storage medium, the system being characterized in that the module of the information storage medium comprises:
   storage means for storing first data comprising a data structure including identification information which identifies process target data, length information indicating data length of the process target data, and the process target data, second data succeeding the first data and comprising the same data structure as that of the data structure of the first data, and third data succeeding the second data and comprising the same data structure as that of the data structure of the first data;
   first communication means for communicating with the medium processing device; and
   data processing means for accessing the process target data included in the second data on the basis of a first command received via the first communication means, the first command specifying the identification information included in the second data and ordering processing of first process data, and subsequently accessing the process target data included in the first data on the basis of a second command received via the first communication means, the second command including a preceding specification and second process data,
   the medium processing device comprising:
   command generating means for generating the first and second commands; and
   second communication means for communication with the information storage medium to input the first and second commands to the information storage medium.

12. A medium processing system comprising an information storage medium comprising a card main body in which a module is embedded and a medium processing device which records data in the information storage medium and which reads data stored in the information storage medium, the system being characterized in that the module of the information storage medium comprises:
   storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data;
   first communication means for communicating with the medium processing device; and
   data processing means for accessing the process target data included in the third data on the basis of a first command received via the communication means, the first command specifying the identification information included in the third data and ordering processing of first process data, and subsequently accessing the process target data included in the fifth data on the basis of a second command received via the communication means, the second command including a succeeding specification and ordering processing of second process data,
   the medium processing device comprising:
   command generating means for generating the first and second commands; and second communication means for communication with the information storage medium to input the first and second commands to the information storage medium.

13. A medium processing system comprising an information storage medium comprising a card main body in which a module is embedded and a medium processing device which records data in the information storage medium and which reads data stored in the information storage medium, the system being characterized in that the module of the information storage medium comprises:

storage means for storing first data comprising a data structure including identification information which identifies process target data, length information indicating data length of the process target data, and the process target data, second data succeeding the first data and comprising the same data structure as that of the data structure of the first data, third data included in the process target data in the second data and comprising the same data structure as that of the data structure of the first data, fourth data included in the process target data in the second data and succeeding the third data, the fourth data comprising the same data structure as that of the data structure of the first data, and fifth data succeeding the second data and comprising the same data structure as that of the data structure of the first data;

first communication means for communicating with the medium processing device; and data processing means for accessing the process target data included in the third data on the basis of a first command received via the first communication means, the first command specifying the identification information included in the third data and ordering processing of first process data, and subsequently accessing the process target data included in the fourth data on the basis of a second command received via the communication means, the second command including a succeeding specification and ordering processing of second process data, the data processing means, after the process of the second command, inhibiting an access to the process target data included in the fifth data based on a third command received via the first communication means, the third command including a succeeding specification and ordering processing of third process data, and after the process of the first command, inhibiting an access to the process target data included in the first data based on a fourth command received via the first communication means, the fourth command including a preceding specification and ordering processing of fourth process data, the medium processing device comprising:

command generating means for generating the first, second, third, and fourth commands; and second communication means for communication with the information storage medium to input the first, second, third, and fourth commands to the information storage medium.

* * * * *